(12) United States Patent
Trouilhet

(10) Patent No.: US 6,224,973 B1
(45) Date of Patent: May 1, 2001

(54) MULTI-LAYER SHEET SUITABLE AS SEALABLE SHEET

(75) Inventor: Yves Trouilhet, Vesenaz (CH)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/391,957

(22) Filed: Sep. 8, 1999

(51) Int. Cl.[7] .................................................. B32B 15/08
(52) U.S. Cl. ........................ 428/340; 428/341; 428/344; 428/354; 428/322; 428/339
(58) Field of Search .................................. 428/340, 341, 428/344, 354, 322, 339; 426/122, 127

(56) References Cited

U.S. PATENT DOCUMENTS 4,656,068 * 4/1987 Raines .
5,145,737  9/1992 Boiron et al. .......................... 428/334

FOREIGN PATENT DOCUMENTS 2628071  9/1989 (FR) ............................ B32B/15/08
1 536 428  3/1975 (GB) ............................ C09J/5/06

* cited by examiner

Primary Examiner—Richard Weisberger

(57) ABSTRACT

A multi-layer sheet suitable as sealable or peelable sheet specially used for closing foodstuff containers or blisters. This multi-layer sheet comprises a tie-layer between a substrate layer and a seal or a peel-seal layer comprising a polyolefin with acid or anhydride, grafted or copolymerized. The tie-layer has a thickness equivalent to 1–7 $g/m^2$. The seal layer comprises a polyolefin. The total thickness of the combination of tie-layer and seal layer is equivalent to 3–20 g/m. This multilayer sheet is prepared by extrusion or coextrusion coating.

19 Claims, 1 Drawing Sheet

MULTI-LAYER SHEET SUITABLE AS SEALABLE SHEET

FIELD OF THE INVENTION

This invention relates to a multi-layer sheet suitable as sealable sheet comprising a tie-layer between a substrate layer and a seal layer, particularly a peel-seal layer intended to be heat-sealed at the edge of a container. Such sealable sheets are specially used as lids for closing foodstuff containers or blisters.

DESCRIPTION OF RELATED ART

Sealable lids as well as peelable lids comprising a substrate layer, one side of which is coated with a seal or a peel-seal layer, are known in the art of packaging, especially for hermetically closing drug packages such as PP blisters or foodstuff containers as disclosed for example in GB 1,536,428. The seal or peel-seal layer of these peelable lids is sealed at the edge of the container either by flat sealing or, particularly for the peel-seal layer, by groove sealing. The substrate layer is either Al, oPET, or glue impregnated paper or board.

Two different kind of peelable layers exist, cohesive peel-seal layers and adhesive peel-seal layers.

The seal and adhesive peel-seal layers may comprise substantially similar polymers. However in the case of a cohesive peel-seal layer, some compounds or fillers are added to the polymer to decrease its breaking strength.

At the present time, most seal or adhesive peel-seal layers are formed by very thin lacquer layers having a thickness of only few $\mu$m, typically below 20 $\mu$m, preferably below 10 $\mu$m. These thin seal or peel-seal layers are very suitable in the field of drugs and foodstuffs packaging. However the drawback of lacquer layers results from the organic solvent which has to be eliminated in-line after applying lacquer onto a substrate layer. The elimination of organic solvents in a dryer is time consuming, so that with high production speeds, such an in-line coating process requires very large plants. Higher production speeds is a general trend observed in the packaging industry, so that the elimination of solvent involves longer dryers in order to limit the amount of residual solvent in the seal or peel-seal layer below legal requirements. Moreover, the recovery of organic solvent is also expensive.

It has already been proposed by U.S. Pat. No. 5,145,737 to obtain a lid having an Al substrate layer, a bonding layer and a sealing layer, by co-extruding the bonding and sealing layer on one side of the Al substrate layer. This technique makes it possible to assemble all three layers in one operation, and eliminates the need for using during manufacture, adhesives and/or lacquers and, hence organic solvents. The bonding layer is a layer of polypropylene, of 2 to about 20 $\mu$m thickness, on which maleic acid has been grafted and the sealing layer is a thick layer of polypropylene of 20 to about 100 $\mu$m thick, containing between 15 to 50% by weight of inert filler. The cover and container are joined by deep sealing so that the action of pulling the cover off the container causes internal breaking of the sealing layer containing the inert filler.

Usually the drawability of the bonding maleic acid grafted polypropylene layer as such would not be able to form a layer as thin as 2 to 20 $\mu$m by extrusion. It is only owing to the coextrusion with a substantially thicker sealing layer that it has been possible to form such a thin bonding layer. Such a peelable layer is not at all similar to that obtained by the wet lacquer coating process.

Another drawback is encountered with some extruded adhesive peel-seal layers of the prior art. When peeling the peel-seal lid off the container, filaments may be formed from the polymer of the peel-seal layer. In the case of a seal sheet for closing e.g. drug packages, the opening is obtained by breaking the sheet which has a breaking strength lower than that of the seal. It is also required in this case that no filaments be formed when breaking such a closure sheet.

Some compounds of polymeric materials of the prior art with thick coating, suitable to form an adhesive peel-seal layer by extrusion may be soluble in foodstuffs such as oil, so that an amount of these compounds, higher than the legal requirements, migrates into the packaged foodstuffs.

SUMMARY OF THE INVENTION

The present invention overcomes at least partially the above-mentioned drawbacks. Specifically a multi-layer sheet suitable as sealable or peelable sheet according to the present invention is defined as comprising a tie-layer between a substrate layer and a seal or peel-seal layer wherein the tie-layer comprises a polyolefin with acid or anhydride, grafted or copolymerised, said tie-layer has a thickness equivalent to 1–7 $g/m^2$, the seal or peel-seal layer comprises a polyolefin, and wherein the total thickness of the combination of tie-layer and the seal or peel-seal layer is equivalent to 3–20 $g/m^2$, preferably to 6–14 $g/m^2$ and said combination has a drawability limit of 12 $g/m^2$ preferably 8 $g/m^2$ or less at a line speed of 300 m/min.

Contrary to the above-mentioned sealing cover according to U.S. Pat. No. 5,145,737, in which a thick sealing layer allows the drawing of a substantially thinner bonding layer, according to one preferred embodiment of the present invention, the tie-layer has a thickness equivalent to 1–7 $g/m^2$ and surprisingly defines the drawability limit of both thin layers having a total thickness equivalent to 3–20 $g/m^2$, preferably to 6–14 $g/m^2$. Moreover the drawability limit of this tie-layer is 8 preferably 6 $g/m^2$ or less at a line speed of 300 m/min and typically allows line speeds as high as 200 to 600 m/min.

According to the invention, the substrate layer comprises at least one of aluminum foil, biaxially oriented polypropylene, polyamide or polyester film.

Preferably, the ethylene copolymer in the tie-layer is selected from ethylene acrylic acid or methacrylic acid copolymer or an ionomer thereof.

According to a more specific embodiment, the tie-layer is neutralized by zinc ionomer.

The invention also covers a tie-layer comprising polyolefin with maleic acid or maleic anhydride grafted or copolymerized.

The polyolefin forming the seal layer advantageously comprises an ethylene copolymer of at least one of vinylacetate, methylacrylate, ethylacrylate and butylacrylate.

According to another aspect of the invention, the peel-seal layer comprises a polypropylene or polyethylene or ethylene copolymer of at least one of vinylacetate, methylacrylate, ethylacrylate, butyl-acrylate, acrylic acid, methacrylic acid or ionomer thereof, and polybutylene.

Alternatively, the peel-seal layer comprises a polypropylene, a polyethylene or ethylene copolymer of at least one of vinylacetate, methylacrylate, ethylacrylate and butylacrylate, and between 5 and 30 weight % of filler.

Most preferably, according to another aspect of the invention the multilayer-sheet is prepared by extrusion or coextrusion coating.

DETAILED DESCRIPTION

Figure 1:
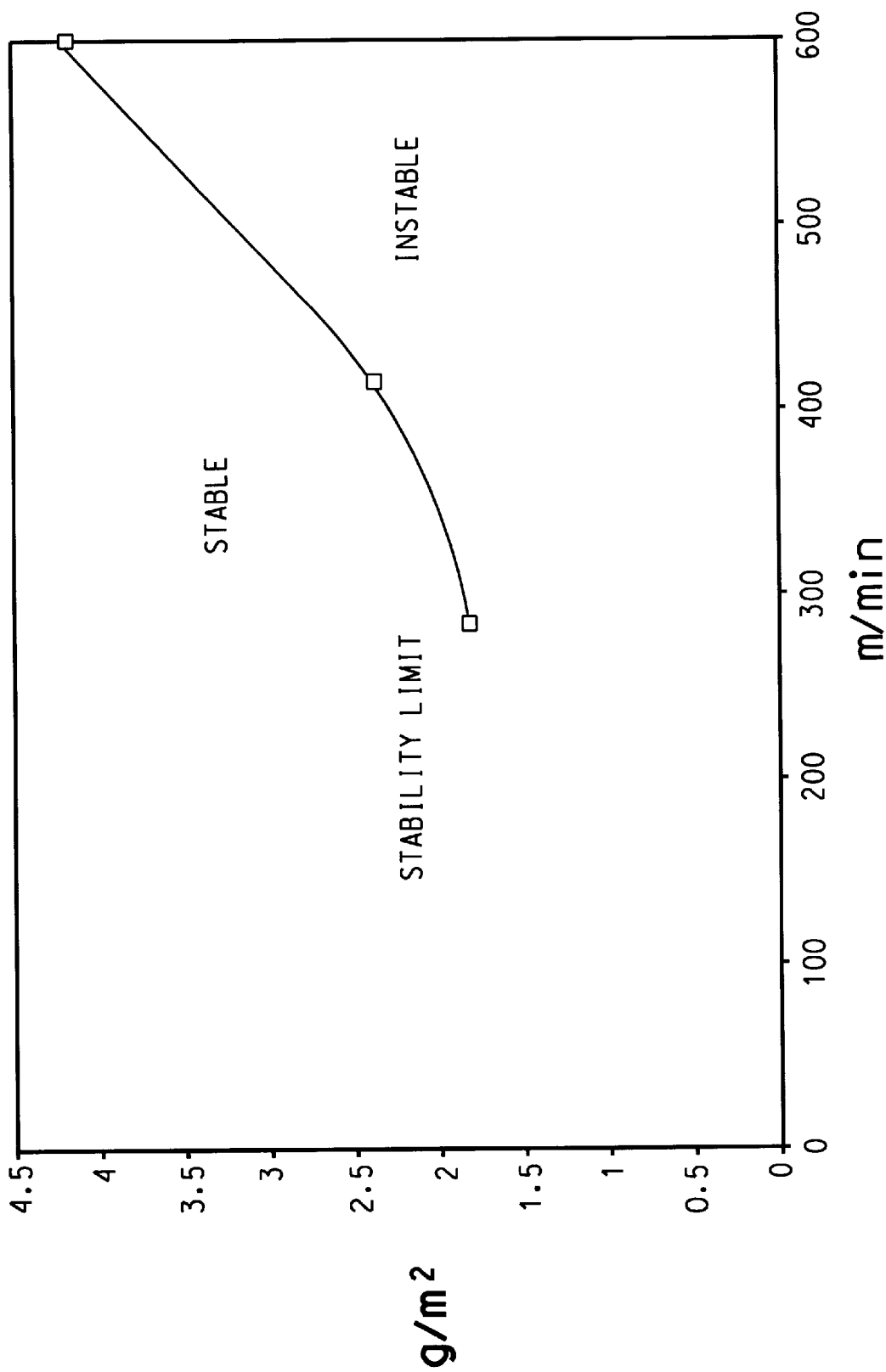
FIG. 1 is diagram illustrating the stability limit of material of a tie layer of a sheet according to the invention, given in g/m² as a function of the take-up velocity.

The polymeric material used for the tie-layer and for the seal or peel-seal layer have been selected in order to satisfy the drawability requirements of extrusion coating/laminating process. Studies have recently been published on the elongational flow between a slot die and a chill-roll to simulate the cast film or extrusion coating/lamination process. The draw ratio is defined as the ratio of the take-up velocity to the extrusion velocity between the die lips. When the draw ratio is increased beyond a critical value, the film can become unstable. Draw resonance is characterized by a sustained oscillation in the film thickness, despite constant speed and take-up speed. Edge weaving is another instability observed with flat dies.

A linear stability analysis of draw resonance in film casting for Newtonian polymer predicts a critical draw ratio of 20. Certain LDPE are used in production at a draw ratio of 40. The polymer used as tie-layer in the present invention is preferably an ionomer resin with a critical draw ratio of 350, available from DuPont as SURLYN® AD2.

The drawability limit of DuPont ionomer resin SUR-LYN® AD2 is given in FIG. 1. It was measured on a 3.5" extruder, L/D=30 with barrel temperatures of 180°, 210°, 240°, 270°, 290° C. as well. The T-slot die with external deckles was set at a width of 700 mm and a gap of 0.7 mm. The air gap was 150 mm.

Under these conditions, the extrusion process started at 25 g/m² and 100 m/min. The line speed was increased at a constant rate of 200 m/min by min. A first onset of instability was observed at one edge at 600 m/min corresponding to a layer thickness of 4.2 g/m². The experiment was repeated, starting at 10 g/m² and 5 g/m² to give the two other points on the curve. It has thus been possible to define upper drawability limits of 8 g/m² preferably 6 g/m² at a line speed of 300 m/min for the tie layer and 12 g/m² preferably 8 g/m², the combination of tie and seal layers.

This high drawability is a unique feature of ionomers generally, and of DuPont ionomer resin SURLYN® AD2 specially. It is explained by the high melt strength given by the ionic bonds. The elongational viscosity increases rapidly with decreasing temperature. Should the melt curtain thickness be decreased locally, due to the cooling of the thinner layer the deformation there will be decreased. This stabilizes the melt curtain.

The excellent drawability of the DuPont ionomer resin SURLYN® AD2 was observed on a dozen of production lines with different types of automatic or manual dies: T-slot with internal deckles, coat hanger dies.

The good thermal stability of the DuPont ionomer resin SURLYN® AD2 is also key factor to be able to extrude at low thickness on existing extrusion coating/laminating lines. This ionomer was extruded successfully up to 310° C. on a 6" extruder turning at 10 rpm, i.e. with relatively high residence time.

The minimum coating thickness is limited in practice by the adhesion to the substrate.

Table 1 below compares adhesion of a 25 g/m² coating on a 40 µm Al-foil of DuPont ionomer resin SURLYN® AD2 and SURLYN® 1652.

TABLE 1

| | Adhesion to Al-foil [N/15 mm] | |
|---|---|---|
| | ionomer SURLYN ® AD2 | ionomer SURLYN ® 1652 |
| 1 day | 4.5 | 2.8 |
| 1 week | 4.9 | 2.9 |
| 6 weeks | 5.1 | 3.1 |

The excellent adhesion of DuPont ionomer resin SUR-LYN® AD2 allows it to be extruded at melt temperatures as low as 260° C., if needed to improve organoleptics.

Adhesion to metallized film as oPET and oPP is good.

The peelable resin may be based on vinyl acetate copolymer of ethylene available from DuPont as BYNEL® 11R704 or 11E554, it may be also based on methyl acrylate copolymer of ethylene available from DuPont as BYNEL® 2014, or polyethylene blended with polybutylene to achieve peelability on itself. It is still possible to use PP filled with 5–30 wt % of calcium carbonate or silicate.

In the following Examples, the substrate is always indicated in the first place and separated from the coextruded layers by //.

EXAMPLES

Examples 1–3: Al// SURLYN® AD2/BYNEL® 11R704

This example describes the preparation of the lid Al// SURLYN® AD2/BYNEL® 11R704 by coextrusion coating and its property as peelable lid when applied to PS and PP.

An Aluminum foil of 30 micron and 550 mm wide was unwound from a roll.

DuPont ionomer resin SURLYN®A D2, is a Zn based ionomer produced from an acrylic acid copolymer of ethylene. It was introduced in extruder A with D=2.5" diameter and L/D=30. The channel depths of the screw were 10.03 mm in the feed zone and 2.28 mm in the metering zone. The length of the different zones was: 5D for the feed zone, 3D for the compression zone, 10D for the metering zone, 2D for the mixing zone, and 10D for the second metering zone. The barrel temperatures were set at 160°, 190°, 220°, 250°, 270° C. The feed-block was at 260° C.

DuPont resin BYNEL® 11R704 is a peelable resin based on vinyl acetate copolymer of ethylene. It was introduced in extruder B with D=3.5" diameter and L/D=30. The channel depths of the screw are 11.25 mm in the feed zone and 3.0 mm in the metering zone. The length of the different zones are: 5D for the feed zone, 3D for the compression zone, 10D for the metering zone, 2D for the mixing zone, and 10D for the second metering zone. The barrel temperatures were set at 160° C., 190° C., 220° C., 240° C., 250° C.

The die temperatures were set at 250° C. on the side of DuPont ionomer resin BYNEL® and 270° C. on the side of DuPont ionomer resin SURLYN®.

The 2 molten polymers merged in a feed-block and were coextruded through a non-automatic T-slot die with external deckles, 800 mm wide, 0.7 mm die gap. Extruders, feed-block and die series 36M were manufactured by Egan.

The Al-foil was coated at 150 m/min line speed. The air-gap between the die and the nip was 150 mm. The chill-roll with a semi mat finish was set at 10° C.

Under these conditions, we produced following peelable lid structures:

Ex. 1: Al//SURLYN® AD2/BYNEL® 11R704, 20//7/7 micron

Ex. 2: Al//SURLYN® AD2/BYNEL® 11R704, 20//5/5 micron

Ex. 3: Al//SURLYN® AD2/BYNEL® 11R704, 20//3/3 micron

These structures were cut in 70 mm diameter lids. They were sealed on PS and PP cups with 70 mm outside diameter and 60 mm inside diameter. We used a Fords heat-sealer (Model HS 18953, Bedford UK) under the following conditions: 3 bar pressure, 220° C. temperature and 0.8 s sealing time.

The thus-sealed lids were opened by pulling at 45 degree to the sealing plane on a Zwick 1425 tensile machine at 100 mm/min. The force registered over distance gives a first maximum value, then a plateau and finally a second maximum value. We measured these forces on empty sealed cups, and also on sealed cups filled with water and yogurt, turned upside down and stored 2 weeks before opening.

The seal forces in N are given in the following Tables 2 for flat seal and in Table 3 for circular grooved seals.

TABLE 2

| Flat seal | | | 1 | 2 | 3 |
|---|---|---|---|---|---|
| PP cups | Empty | Maximum force (N) | >20 | 18 | 16 |
| | | Plateau (N) | 7 | 7 | 6 |
| | Filled | Maximum force (N) | 20 | 17 | 14 |
| | | Plateau (N) | 8 | 8 | 7 |
| PS cups | Empty | Maximum force (N) | 11 | 11 | 7 |
| | | Plateau (N) | 4 | 4 | 3 |
| | Filled | Maximum force (N) | 10 | 8 | 7 |
| | | Plateau (N) | 5 | 3 | 3 |

No leakers were observed during the 2 weeks storage with the cups upside down filled with water or yogurt. No filaments near the seal were observed when opening the sealed cup.

TABLE 3

| Grooved seal | | | 1 | 2 | 3 |
|---|---|---|---|---|---|
| PP cups | Empty | Maximum force (N) | 7 | 9 | 11 |
| | | Plateau (N) | 5 | 4 | 4 |
| PS cups | Empty | Maximum force (N) | 7 | 6 | 4 |
| | | Plateau (N) | 4 | 3 | 2 |

The structure of Example 2 was submitted to total migration tests following EEC regulations 85/572 dated Dec. 19, 1985, 90/128 dated Feb. 23, 1990 and 93/8 dated Mar. 15, 1993, for packaging products with direct food contact. The test consisted in leaving the structure in contact with oil during 10 days at 40° C. Under these conditions, the migration averaged over 3 samples is 10 mg/dm. This allows use of this lid in direct contact with fatty food products.

Examples 4–5: Al//SURLYN®AD2/BYNEL® 11E554 or BYNEL® 2014

DuPont resin BYNEL® 11E554 is a peel-seal resin based on vinyl acetate copolymer of ethylene produced with a MI of 8 dg/min (ASTM D1238), a density of 930 Kg/m3 (ASTM D1505) and a melting temperature of 94° C. (ASTM D3418). We added 2% Conpol® 20S2, a slip additive also produced by DuPont de Nemours.

DuPont resin BYNEL® 2014 is a peel resin based on methyl acrylate copolymer of ethylene produced with MI of 7.9 dg/min at 190° C., 2.16 Kg a density of 939 Kg/m$^3$ and a melting temperature of $_{86}$° C.

We produced this peelable lid to close PS, PP, PVC and PET containers, by coextrusion coating with the same installation as described for Examples 1 to 3. Example 4 was produced under the same processing conditions as given for Examples 1 to 3. Example 5 was produced at higher temperatures:

160° C., 200° C., 240° C., 280° C., 290° C. for the barrel temperatures of both extruders, 290° C. for the adapter, connecting pipes, feed-block and die temperatures.

The thus-produced peelable lid applied to PS, PP, PVC and PET containers had following structure:

Ex. 4: Al//SURLYN® AD2/98% BYNEL® 11E554+ 2%CONPOL® 20S2, 35//7/10 μm.

Ex. 5: Al//SURLYN® AD2/98% BYNEL® 2014, 35//7/10 μm

These structures were cut in 15 mm strips then sealed to PS, PP, PVC and PET sheets of the same width. The sealing was done with a Sentinels (Packaging Industry, Massachusetts, Model 12AS) heat sealer with the Al-foil in contact with the heated bar under a pressure of 0.3 Mpa and 1 second sealing time.

The seal forces of samples 5 and 6 to the strips were measured with a Zwick 1425 tensile machine at 100 mm/min and 180 degree peel angle. The heat seal strengths in N/15mm are given in the following Table 4 as a function of seal bar temperatures:

TABLE 4

| | 100° C. | 120° C. | 140° C. | 160° C. | 180° C. |
|---|---|---|---|---|---|
| Example 4 | | | | | |
| PS sheet | 7 | 9.7 | 11.7 | 13 | 13.6 |
| PP sheet | 7.4 | 8 | 9 | 10 | 11.4 |
| PET sheet | 6 | 7.6 | 8.6 | 8.5 | 8 |
| PVC sheet | 9 | 11.6 | 12.4 | 13.8 | 14.6 |
| Example 5 | | | | | |
| PS sheet | 3 | 3.6 | 4.5 | 5.5 | 6.6 |
| PP sheet | .5 | 3.6 | 5.6 | 8.5 | 10 |
| PET sheet | 0.8 | 1.4 | 3.4 | 4.7 | 5 |
| PVC sheet | 2.6 | 3 | 3.8 | 5.5 | 9 |

The coefficients of friction metal-to-seal layer measured 10 days after production of Examples 4 and 5 are given in Table 5.

TABLE 5

| | Static | Dynamic |
|---|---|---|
| Example 4 | 0.45 | 0.38 |
| Example 5 | 0.56 | 0.51 |

Examples 6–8: Al//SURLYN® AD2/ELVAX® 3200-2

These Examples describe the properties of these structures of an Al substrate, DuPont ionomer resin SURLYN® AD2 and DuPont resin ELVAX® 3200 as cover material on PVC or PP blisters. ELVAX® is a wax modified ethylene-vinyl acetate copolymer with 32 dg/min MI and a melting temperature of 71° C.

We produced the cover materials by coextrusion coating of a tie and seal layer on hard Al-foil, 20 μm.

The coextrusion coating installation and conditions were similar to the ones described for Examples 1, 2 and 3. Under these conditions we produced the following cover materials:

Ex. 6: Al hard//SURLYN® AD2/ELVAX® 3200-2, 20// 3/5 μm

Ex. 7: Al hard//SURLYN® AD2/ELVAX® 3200-2, 20//3/7 μm

Ex. 8: Al hard//SURLYN® AD2/ELVAX® 3200-2, 20//3/9 μm

These sheets were sealed at 180° C. to PVC and PP blisters. No elongation of the thin polymer layers were observed when breaking the cover materials.

Example 9 MELINEX® D820/NUCREL® 0609HSA/PE+Polybutylene

This Example describes a structure peelable to PE or to itself.

DuPont resin MELINEX® D820 is a biaxially oriented PET film that can be extruded coated with polyethylene or ethylene copolymers.

DuPont resin NUCREL® 0609HSA is a methacrylic acid (6% by weight) copolymer of ethylene with a MI of 9dg/min.

As a mono layer it has a drawability limit of 6 g/m² at 300 m/min.

Polybutylene from Shell Chemical Corporation blended in polyethylene or polypropylene is common practice as a seal layer to achieve peelability on itself or on polyethylene. Polybutylene 0300 having 4.0 dg/min MI was dry blended in a tumbler mixer with Stamylan 2304 produced by DSM.

We coextruded the 2 resins on the same installation as described for Examples 1, 2 and 3. Extruder temperatures were set at 160° C., 200° C., 240° C., 280° C., 300° C. for both extruders, 300° C. for the adapter, connecting pipes, feed-block and die.

Under these conditions we produced following structure:

Ex. 9: MELINEX® D820//NUCREL® 0609HSA/85% Stamylan 2304+20% polybutylene 0300, 12//5/10 micron This structure was sealed to itself with a Kopp sealer with 2 heated bars under 0.3 Mpa pressure and 1 second sealing time. The peel/seal strength measured on a Zwick 1425 tensile machine at 100 m/min on 15 mm wide strips are given as a function of heat seal bar temperatures in the following Table 6:

TABLE 6

| 120° C. | 140° C. | 160° C. | 180° C. | 200° C. |
|---------|---------|---------|---------|---------|
| 3.0     | 3.2     | 3.6     | 3.7     | 3.9     |

Very little stringing was observed at these thin sealing layers.

Example 10: Al//BYNEL® XB604/Filled PP

This Example describes a peelable retortable lid for trays with PP as inner layer of the trays.

DuPont resin BYNEL® XB604 is a polypropylene coextrudable adhesive containing grafted maleic anhydride. As a monolayer it has a drawability limit of 15 g/m² at 100 m/min.

It was coextruded as a tie layer with WG341, a filled PP from Borealis as a peel/seal layer.

We used the same installation as described under Examples 1 to 3 at processing temperatures of 180° C., 210° C., 250° C., 270° C., 280° C. for both extruders with DuPont resins BYNEL® XB604 and WG341, 280 C. for the adapters, connecting pipes, feed-block and die. We produced at 180 m/min the following structure:

Ex. 10: Al//BYNEL® XB604/XEC341, 90//6/12 micron

This lid withstands retort at 127 C., half an hour when sealed on trays Al/PP (110/40 micron) filled with water. The thus sealed trays at 200 C. were easy to open.

What is claimed is:

1. Multi-layer sheet comprising a tie-layer between a substrate layer and a seal layer wherein the tie-layer comprises a polyolefin with acid or anhydride, grafted or copolymerized, said tie-layer has a thickness equivalent to 1–7 g/m², the seal layer comprises a polyolefin, and wherein the total thickness of the combination of tie-layer and the seal layer is equivalent to 3–20 g/m², and said combination has a drawability limit of 12 g/m² or less at a line speed of 300 m/min.

2. Multi-layer sheet according to claim 1 wherein said seal layer is a peel-seal layer.

3. Multi-layer sheet according to claim 1, wherein said tie-layer has a drawability limit of 7 g/m² or less at a line speed of 300 m/min.

4. Multi-layer sheet according to claim 1 wherein the substrate layer comprises at least one selected from the group consisting of aluminum foil, biaxially oriented polypropylene, polyamide or polyester film.

5. Multi-layer sheet according to claim 1 wherein the polyolefin in the tie-layer is an ethylene copolymer selected from the group consisting of acrylic acid, methacrylic acid, maleic anhydride, or maleic acid or an ionomer thereof.

6. Multi-layer sheet according to claim 1 wherein the tie-layer comprises zinc ionomer.

7. Multi-layer sheet according to claim 1 wherein the tie-layer comprises at least one of a maleic acid-grafted grafted polyolefin and a maleic anhydride-grafted polyolefin.

8. Multi-layer sheet according to claim 1 wherein the seal layer comprises an ethylene copolymer of at least one of vinylacetate, methylacrylate, ethylacrylate and butylacrylate.

9. Multi-layer sheet according to claim 2 wherein said peel-seal layer comprises a polyethylene or ethylene copolymer of at least one of vinylacetate, methylacrylate, ethylacrylate and butylacrylate, and at least one of acrylic acid, methacrylic acid or ionomer thereof, or polypropylene and polybutylene.

10. Multi-layer sheet according to claim 2 wherein said peel-seal layer comprises a polypropylene or a polyethylene or ethylene copolymer of at least one of vinylacetate, methylacrylate, ethylacrylate and butyl-acrylate, and between 5 and 50 weight % of filler.

11. Multi-layer sheet according to claim 1 which is prepared by extrusion or coextrusion coating.

12. Multi-layer sheet according to claim 2 which is prepared by extrusion or coextrusion coating.

13. Multi-layer sheet according to claim 2, wherein said tie-layer has a drawability limit of 7 g/m² or less at a line speed of 300 m/min.

14. Multi-layer sheet according to claim 2 wherein the substrate layer comprises at least one of aluminum foil, biaxially oriented polypropylene, polyamid or polyester film.

15. Multi-layer sheet according to claim 2 wherein the polyolefin in the tie-layer is an ethylene copolymer selected from ethylene acrylic acid, methacrylic acid copolymer or maleic acid or an ionomer thereof.

16. Multi-layer sheet according to claim 2 wherein the tie-layer comprises zinc ionomer.

17. Multi-layer sheet according to claim 2 wherein the tie-layer comprises at least one of a maleic acid-grafted polyolefin and a maleic anhydride-grafted polyolefin.

18. Multi-layer sheet according to claim 1 wherein the total thickness of the combination of tie-layer and the seal layer is equivalent to 6–14 g/m².

19. Multi-layer sheet according to claim 1 wherein said combination has a drawability limit of 8 g/m² or less at a line speed of 300 m/min.

* * * * *

UNITED STATES PATENT AND TRADEMARK OFFICE
CERTIFICATE OF CORRECTION

PATENT NO. : 6,224,973 B1
DATED : May 1, 2001
INVENTOR(S) : Yves Trouilhet

It is certified that error appears in the above-identified patent and that said Letters Patent is hereby corrected as shown below:

<u>Column 8, claim 7,</u>
Line 26, delete "grafted" [grafted] polyolefin and a maleic anhydride-grafted poly- <u>Column 8, claim 10,</u>
Line 40, delete "-" methylacrylate, ethylacrylate and butyl[-]acrylate, and Signed and Sealed this Sixth Day of November, 2001

Attest:

NICHOLAS P. GODICI
Attesting Officer    Acting Director of the United States Patent and Trademark Office